US007735865B2

(12) United States Patent
Cappabianca et al.

(10) Patent No.: US 7,735,865 B2
(45) Date of Patent: Jun. 15, 2010

(54) KNEE BOLSTER ASSEMBLY

(75) Inventors: Douglas Michael Cappabianca, Canton, MI (US); Joseph Anthony Camilletti, III, Sterling Heights, MI (US); Zhenjian Huang, Canton, MI (US); Paul Gregory St. Angelo, Royal Oak, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 332 days.

(21) Appl. No.: 11/780,282

(22) Filed: Jul. 19, 2007

(65) Prior Publication Data

US 2009/0020993 A1    Jan. 22, 2009

(51) Int. Cl.
*B60R 21/045* (2006.01)

(52) U.S. Cl. .................... 280/752; 180/90; 297/488

(58) Field of Classification Search .............. 280/748, 280/751, 752; 180/90; 297/488; *B60R 21/04*
See application file for complete search history.

(56) References Cited

U.S. PATENT DOCUMENTS

| | | | |
|---|---|---|---|
| 4,065,157 A * | 12/1977 | Abe et al. ................ 280/751 |
| 5,518,270 A | 5/1996 | Hanada et al. |
| 6,196,588 B1 | 3/2001 | Sugawara |
| 6,213,504 B1 | 4/2001 | Isano et al. |
| 6,702,324 B2 | 3/2004 | Shimoyamada et al. |
| 6,783,156 B2 | 8/2004 | Chickmenahalli et al. |
| 6,948,738 B2 | 9/2005 | Garanweidner et al. |
| 7,331,606 B2 * | 2/2008 | Riefe et al. ................ 280/752 |
| 7,393,013 B2 * | 7/2008 | Best et al. ................ 280/752 |
| 7,481,457 B2 * | 1/2009 | Best et al. ................ 280/752 |
| 7,513,528 B2 * | 4/2009 | Penner ................ 280/752 |
| 2005/0001416 A1 | 1/2005 | Muramatsu et al. |
| 2008/0007039 A1 * | 1/2008 | Iwasaki et al. ............ 280/752 |
| 2008/0048425 A1 * | 2/2008 | Hayata ................ 280/751 |

* cited by examiner

*Primary Examiner*—Paul N Dickson
*Assistant Examiner*—Drew Brown
(74) *Attorney, Agent, or Firm*—Brinks Hofer Gilson & Lione

(57) ABSTRACT

A knee bolster, disposed within the instrument panel of an automotive vehicle, for absorbing energy from impact with the knees of an occupant of the automotive vehicle, the knee bolster assembly comprising a skin defining a show surface of the instrument panel, an inner panel secured to the skin, the inner panel including at least one male portion protruding therefrom in a direction away from the skin, at least one energy absorbing structure extending in a direction away from the inner panel, the energy absorbing structure having portions defining at least one recess therein, the male portions of the inner panel being received within the recess of the energy absorbing structures in a non-contacting alignment.

20 Claims, 3 Drawing Sheets

KNEE BOLSTER ASSEMBLY

BACKGROUND OF THE INVENTION

1. Field of the Invention

The present invention relates to a knee bolster, for an automotive vehicle, that absorbs the energy of impact that occurs between the instrument panel of the vehicle and the knees of an occupant during a collision. More specifically, the present invention relates to a knee bolster construction in which relative movement between the knee bolster and its associated energy absorbing structure is substantially eliminated.

2. Description of Related Technology

Knee bolsters are provided in the lower portions of an instrument panel, generally facing the legs of the passengers residing in the front seats of the automotive vehicle. During frontal impacts, one criteria for acceptable knee bolster performance is the effectiveness of the knee bolster in transferring impact loads to an energy absorbing structure located within the instrument panel. To accomplish this objective, the force exerted on the knee bolster, by the occupant's knees, is transferred to an energy absorbing structure that is configured to collapse during impact thereby dissipating the received energy. The energy absorbing structure collapses in a controlled manner so as to limit the depth that the knees of the occupant will intrude into the instrument panel. Controlling this collapse has proven to be difficult.

Current technology connects the knee bolster to the energy absorbing structure in several ways, depending on the materials used for the knee bolster. Generally, a knee bolster includes an outer skin coupled to an inner panel, which is conventional formed of either steel or plastic. When using steel, the inner panel is bolted, riveted or otherwise secured to the energy absorbing structures. While this is effective in securing the panel to the energy absorbing structure, it creates the possibility that the fasteners used in securing the inner panel will be visible as raised areas on the visible, class "A" surface of the skin.

When utilizing plastic, two sets of ribs have been provided to project from the interior surface of the inner panel and generally define a channel in a form outlining the shape of the energy absorbing structure. The energy absorbing structure is received between the two sets of ribs so as locate the inner panel relative to the energy absorbing structure. Relative movement between these two parts is not eliminated in that the parts are not fastened together. During an impact, the force of the impact may be sufficient to cause the energy absorbing structure to ride over the ribs and out of the channel or/and deform the ribs. If this happens, the inner panel will shift relative to the energy absorbing structure during impact, not allow the energy absorbing structure to properly absorb the impact. To overcome this and provide adequate stiffness, the size and number of ribs may become so great that their space requirement exceeds the available area on the surface of the inner panel.

Another approach is to use clips to attach the inner panel to the energy absorbing structure. While this concept adds a link between the two components, it may not be robust enough to withstand the impact load from an occupant of the vehicle during a collision.

SUMMARY OF THE INVENTION

In overcoming the enumerated drawbacks and other limitations of the known technology, the present invention provides a knee bolster assembly in which the knee bolster is linked to the energy absorbing structure in a manner that substantially eliminates undesirable relative movement between the two components, without the use of fasteners. This is achieved through the use of a bolster key. The bolster key is designed such that it prevents interaction between the bolster and any of the surrounding instrument panel structures prior to an impact event. During an impact event, the bolster key is driven into an opening in the energy absorbing structure. As a result of its shape, the key automatically centers the bolster relative to the energy absorbing structure and eventually bottoms out and locks the knee bolster in position relative to the energy absorbing structure. Thereafter, the energy absorbing structure will be caused to collapse in its designed manner without the risk of the knee bolster moving relative to the energy absorbing structure in an undesirable manner, thereby limiting the effectiveness of the energy absorbing structure.

The bolster key is a conical feature extending from the inner panel of the knee bolster into a correspondingly shaped opening or recess in the energy absorbing structure. While the bolster key extends into the opening of the energy absorbing structure, it does not contact the portions defining the opening prior to a knee impact event. This enables the appearance of the instrument panel to be maintained without mounting structures being visible therethrough. Additionally, this lack of contact eliminates the risk of rattles, squeaks and other noises between other components. The conical shape of the bolster key provides the key with inherent strength as compared to ribs or a wall, while maintaining a minimal weight and foot print on the inner panel. The stiffness of the conical shape is also well suited to resist the high stresses that inevitably result from a knee impact event, thereby preventing relative movement and failure of the connection between the knee bolster and the energy absorbing structure. Another benefit of this shape is the minimal time it takes to engage the knee bolster, via the key, with the energy absorbing structure during an impact event.

Further objects, features and advantages of this invention will become readily apparent to persons skilled in the art after a review of the following description, with reference to the drawing and claims that are appended to and form a part of this specification.

DETAILED DESCRIPTION OF THE PREFERRED EMBODIMENTS

Figure 1:
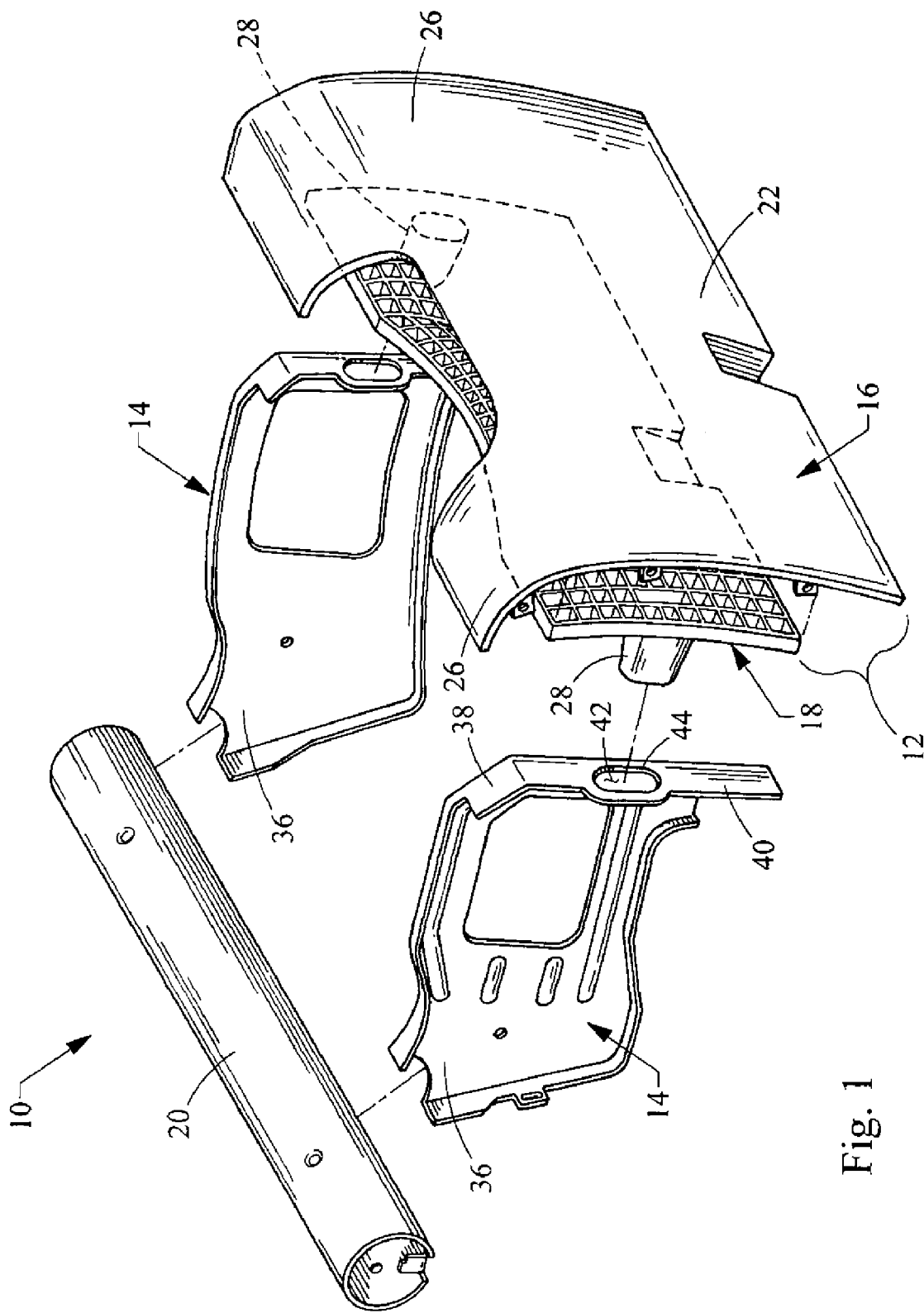
FIG. 1 is an exploded perspective view of a knee bolster embodying the principles of the present invention.

Referring now the drawings, a knee bolster assembly embodying the principles of the present invention is illustrated therein and generally designated at 10. As its principal components, the knee bolster assembly 10 includes a knee bolster 12 and one or more energy absorbing structures ("EA structure") 14, two of which are used in the illustrated embodiment. The knee bolster 12 itself may be formed of two components, a skin 16 and an inner panel 18.

The knee bolster assembly 10 is installed and forms part of an instrument panel of an automotive vehicle. As such, the knee bolster assembly is disposed in the occupant compartment of the vehicle, generally in front of and facing toward the front seats of the vehicle. More specifically, a separate knee bolster assembly is disposed in front of both the front driver seat and front passenger seat. As shown and further described herein, the knee bolster assembly 10 is depicted as one intended to be provided in front of the driver seat. It will be readily appreciated, however, that the knee bolster assembly 10 could be alternatively provided in front the front passenger seat without departing from scope and principles of the present invention.

The knee bolster assembly 10 is provided so as to interact with a structural component of the automotive vehicle, such as a cross-car beam 20. The cross-beam 20 is disposed beneath the instrument panel and traverses the vehicle laterally, with both ends of the cross-car beam being secured to body panels or other structural portions of the vehicle. During a collision, the cross-car beam 20 functions as a reaction member for the knee bolster assembly 10. In other words, the cross-car beam 20 is designed to remain structurally intact during a collision such that the EA structure 14 of the knee bolster assembly 10 will bear thereagainst and be caused to collapse in a controlled manner. The cross-car beam 20 can take many forms and shapes, and, as illustrated, it is provided with a tubular shape.

As mentioned above, the knee bolster 12 includes the skin 16 and the inner panel 18. The skin 16 is the portion of the knee bolster 12 that is visible to the occupants of the vehicle. Accordingly, the skin 16 includes a show or class "A" surface 22 in the interior of the vehicle. The skin 16 itself may be a semi-rigid structure having a monolithic or layered construction with an outer layer provided over a more rigid substrate layer. Accordingly, the skin 16 may be formed from any suitable material, including, without limitation, those currently used in instrument panel construction. One such preferred materials for the skin 16 is polyurethane. Since the formation of skins for instrument panels is well known and beyond the scope of the present invention, further details regarding the construction and formation of the skin 16 need not and are not set out herein.

Secured to the skin on the interior surface 24 thereof, opposite the class "A" surface 22, is the inner panel 18. The inner panel 18 is a generally planar and rectangular (although other shapes could be employed) body extending substantially across the width of the skin 16 of the knee bolster 12. As such, the inner panel includes spaced apart lateral ends 26 oriented to the left and right sides of the vehicle. The inner panel 18 is secured to the skin 16 so as to be integral therewith. This securement may be achieved through any well known technique, however, the skin 16 and the inner panel 18 are preferably ultrasonically welded together so as to prevent movement of one relative to the other. By ultrasonically welding the skin 16 to the inner panel 18, attachment features for securing the skin 16 to the inner panel 18 will not be visible as bumps or other discontinuities in the class "A" surface 22. Obviously, the inner panel 18 is formed of a plastic material that is compatible with the material of the skin 16 to facilitate securement between the two.

Extending from the inner panel 18, in a direction away from the skin 16, are one or more bolster keys 28. As seen in FIG. 1, two bolster keys 28 are provided on the inner panel 18 generally adjacent to the lateral ends 26 thereof. The bolster keys 28 are male protrusions having a conical shape. Being conical, each bolster key 28 tapers from a base 30, adjacent to the body 32 of the inner panel 18, to a smaller dimension at a distal end 34 of the bolster key 28.

The EA structures 14, with which the knee bolster 12 interacts, extend generally from the cross-car beam 20 toward the knee bolster 12 in the form of an arm or stay. While the knee bolster 12 is preferably formed from a plastic material, the EA structure 14 is preferably formed from stamped sheet metal and configured to collapse in a prescribed manner, via various shaped or purposefully weakened structures during a knee impact event, as well know in the industry and further described below. Thus, the EA structures 14 include a first end 36 coupled to the cross-car beam 20 and a second end 38 adjacent to the knee bolster 12. The second end 38 preferably includes planar face 40 that is presented toward the knee bolster 12. Defined in the face 40 is a keyhole 42, which is in the form of a recess or opening in the face 40 and is correspondingly shaped to receive a bolster key 28 therein. Preferably, the dimensions of the keyhole 42 are greater than the dimensions of the bolster key 28 at its distal end 34, but less than the dimensions of the bolster key 28 at the base 30. In this manner, the bolster key 28 is received within the keyhole 42, but does not contacting the wall portion 44 of the face 40 defining the keyhole 42. This non-contacting alignment is perhaps best seen with referenced FIG. 2.

Figure 2:
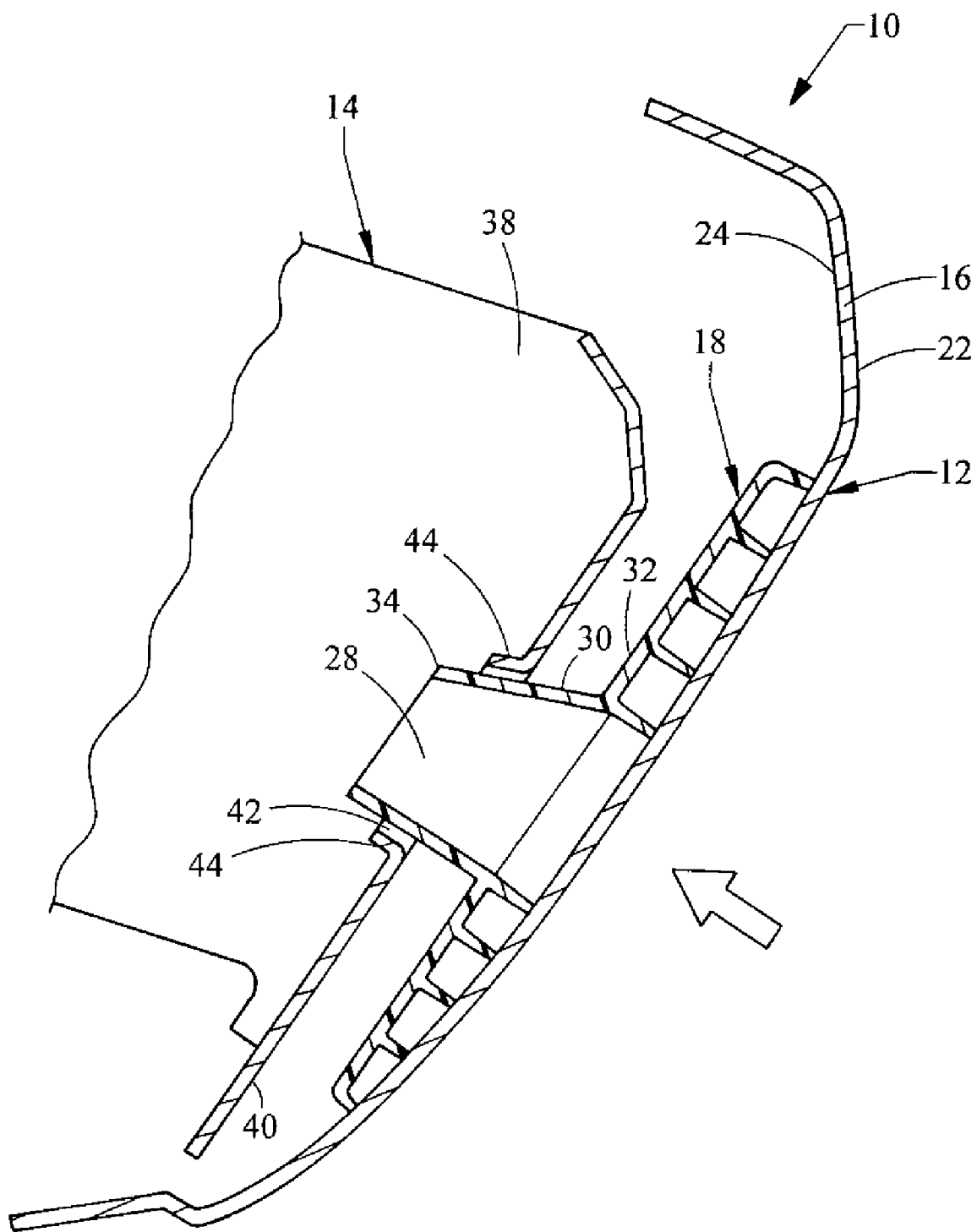
FIG. 2 is a side cross-sectional view through the assembled knee bolster of FIG. 1.

Also as depicted in FIG. 2, the wall portions 44 defining the keyhole 42 form an inwardly turned flange about the keyhole 42. During normal operation of the vehicle, the gap provided by the non-contacting alignment of the bolster key 28 within the keyhole 42 prevents vibration and noise from originating as a result of the interaction of these components. During a knee impact event, the knee of an occupant of the vehicle is forced into contact with the knee bolster 12. As a result of this initial impact, the bolster key 28 is driven into the keyhole 42. As the bolster key 28 progressively enters the keyhole 42, the outer dimension of the base 30 of the bolster key 28 causes the bolster key 28 to engage the wall portions 44 of the keyhole 42. Eventually, because the dimension of the base 30 is greater than the dimension of the wall portions 44 defining the keyhole 42, the bolster key 28 bottoms out and locks the inner panel 18 to the EA structure 14. With this locking of the inner panel 18 to the EA structure 14, undesirable movement of the inner panel relative to the EA structure is prevented. By preventing undesirable relative movement between these two components, the assembly 10 ensures that the impact forces are transferred as designed to the EA structure 14, which will as a result collapse in an intended and controlled manner. Should the inner panel 18 move relative to the EA structure 14 during an impact event, the EA structure may not collapse as designed, resulting in the EA structure not absorbing and dissipating the desired amount of energy.

Preferably, the bolster keys 28 are provided on the inner panel 18 at a vertical (relative to the orientation of the vehicle) location that generally corresponds with the fiftieth percentile impact area of the knee bolster assembly 10. The fiftieth percentile impact area is that area encompassing the knee height of approximately 50 percent of the driving population.

Figure 3A:
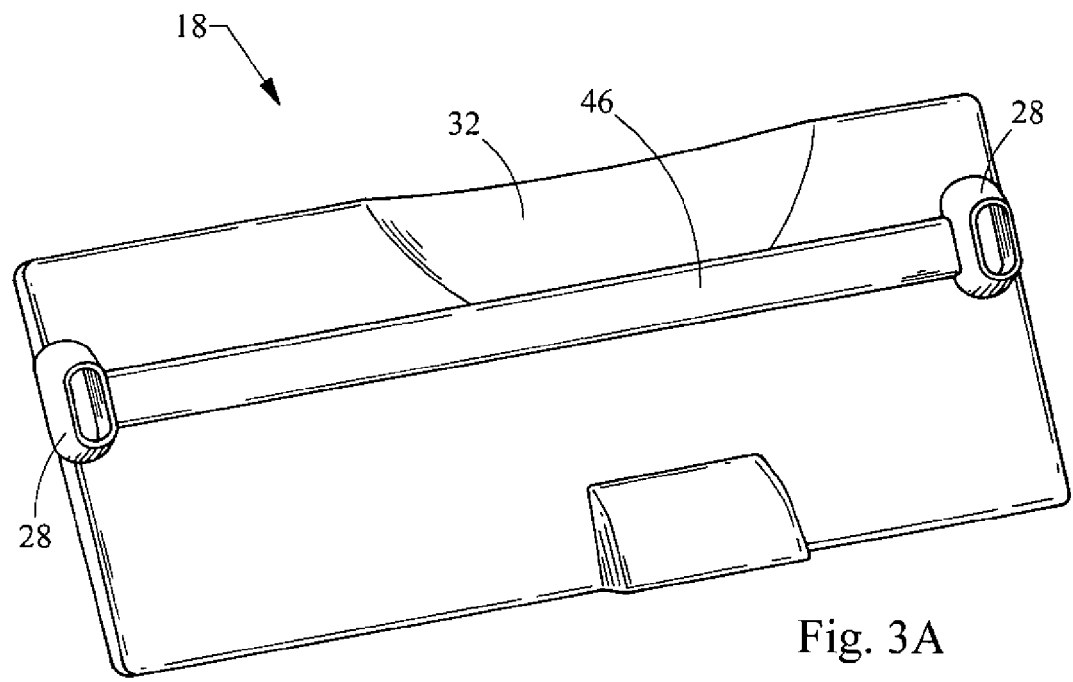
FIG. 3A is a rear view of an inner panel having one set of bolster keys and a reinforcement member extending therebetween.

To add rigidity and stiffen the inner panel 18, thereby more evenly transferring impact loads to the EA structures 14, a reinforcing member 46 may be provided on the inner panel 18. As seen in FIG. 3A, the reinforcing member 46 is a channel or rib formed in or provided on the inner panel and extending between the bolster keys 28. As illustrated, the reinforcing member 46 extends completely between the bolster keys 28. It will be appreciated, however, that the reinforcement member 46 can extend less than completely between the bolster keys 28.

Figure 3B:
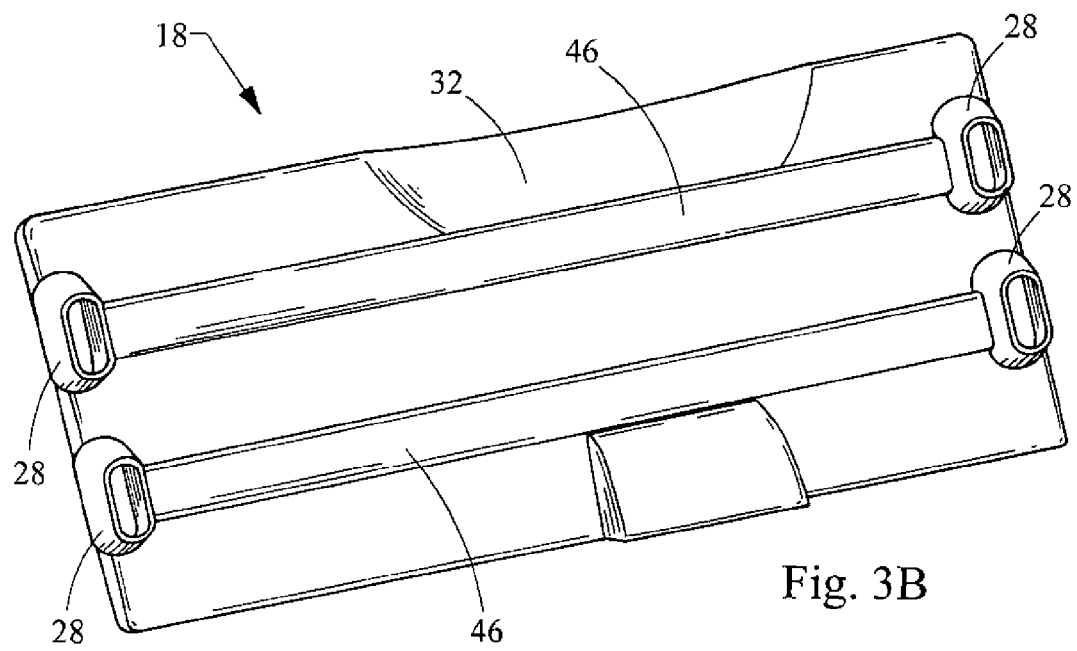
FIG. 3B is a rear view of a second embodiment of and inner panel, having two sets of bolster keys, each set further having a reinforcement member extending therebetween.

The knee bolster assembly 10 may be provided with additional bolster keys 28. As seen in this FIG. 3B, an additional set of bolster keys 28 are provided on the inner panel 18 as a lower set of bolster keys 28. This lower set of bolster keys 28 may be provided at a location on the knee bolster assembly 10 corresponding to a different percentile impact area. For example, the lower set of bolster keys 28 may be provided at a fifth percentile impact area of the knee bolster assembly 10. Similar to the previously described construction, an additional reinforcing member 46 may also be provided so as to extend between the lower set of bolster keys 28.

As seen from the above discussion, the bolster keys 28 offer a mechanism for linking the knee bolster 12 to the EA structures 14 without the use of fasteners. This construction supports the effective transfer of occupant knee load energy between the knee bolster 12 and the EA structure 14 by eliminating potential undesirable relative movement between the two components. Additionally, the non-contacting alignment of the bolster key 28 within the keyhole 42 eliminate noise and vibration issues between the two components. Finally, by not requiring the use of fasteners, appearance issues on the class A 22 of the skin 16, as a result thereof are also eliminated.

As a person skilled in the art will readily appreciate the above description as meant as an illustration of implementation of the principles of this invention. This description is not intended to limit the scope of application of this invention since the invention is susceptible to modification, variation and change, without departing from the spirit as defined in the claims.

The invention claimed is:

1. A knee bolster assembly, disposed within the instrument panel of an automotive vehicle, for absorbing energy from impact with the knees of an occupant of the automotive vehicle during a collision, the knee bolster assembly comprising:
   a knee bolster having a skin and an inner panel, the skin defining a show surface of the instrument panel, the inner panel being secured to the skin and including a male protrusion protruding therefrom in a direction away from the skin; and
   an energy absorbing structure extending in a direction away from the inner panel, the energy absorbing structure having portions defining a recess therein, the male protrusion of the inner panel being non-engaged with the energy absorbing structure and received within the recess of the energy absorbing structure in a non-contacting alignment.

2. The knee bolster of claim 1 wherein the male protrusion decreases in diameter along its length in a direction proceeding away from the inner panel and is sized so as to engage the recess upon advancement into the recess.

3. The knee bolster of claim 1 wherein the male protrusion includes a base adjacent the inner panel and a distal end, the base having a width being greater than a corresponding width of the recess.

4. The knee bolster of claim 1 wherein the energy absorbing structure includes a proximal end located adjacent to the inner panel, the recess being defined in the proximal end.

5. The knee bolster of claim 4 wherein the proximal end includes a planar face, the recess being formed in the planar face.

6. The knee bolster of claim 1 wherein the inner panel includes two male protrusions, the male portions being generally disposed on opposing sides of the inner panel.

7. The knee bolster of claim 6 further comprising a reinforcement member extending generally between the male portions.

8. The knee bolster of claim 7 wherein the reinforcement member extends along the inner panel.

9. The knee bolster of claim 1 further comprising an upper set of male protrusions and a lower set of male protrusions, the male protrusions of the upper set being generally disposed on opposite sides of the inner panel, and the lower set being generally disposed on opposing sides of the inner panel.

10. The knee bolster of claim 9 further comprising upper and lower reinforcement members respectively extending between the male protrusions of the upper set and the lower set.

11. The knee bolster of claim 1 wherein the skin and the inner panel are secured by a vibrational weld.

12. The knee bolster of claim 1 wherein the skin is over molded about the inner panel thereby securing the skin to the inner panel.

13. The knee bolster of claim 1 wherein the skin and the inner panel are unitary.

14. The knee bolster of claim 1 wherein the energy absorbing structure is a stay extending generally from the inner panel to a cross car beam of the motor vehicle.

15. A knee bolster assembly, disposed within the instrument panel of an automotive vehicle, for absorbing energy from impact with the knees of an occupant of the automotive vehicle during a collision, the knee bolster assembly comprising:
   a knee bolster having a skin and an inner panel, the skin defining a show surface of the instrument panel, the inner panel being secured to the skin and including a male protrusion protruding therefrom in a direction away from the skin; and
   an energy absorbing structure extending in a direction away from the inner panel, the energy absorbing structure having portions defining a recess therein, wherein the male protrusion is a conical boss.

16. A knee bolster assembly for absorbing energy from impact with the knees of an occupant of the automotive vehicle during a collision, the knee bolster assembly comprising:
   a skin defining a show surface of the knee bolster assembly;
   an inner panel secured to the skin and including a first cooperating feature;
   an energy absorbing structure defining a stay extending in a direction away from the inner panel, one end of the energy absorbing structure having a second cooperating feature;
   wherein the first cooperating feature is free from contact with the stay and wherein one of the first and second cooperating features is received in non-contacting alignment within the other of the first and second cooperating features;
   whereby the inner panel is located relative to the at least one energy absorbing structure.

17. The knee bolster assembly of claim 16 wherein the first cooperating feature is a protruding member.

18. The knee bolster assembly of claim 17 wherein the protruding member is conical in shape.

19. The knee bolster assembly of claim 16 wherein the second cooperating feature is a recess defined within the one end of the energy absorbing structure.

20. The knee bolster assembly of claim 19 wherein the first cooperating feature is a protruding member having a base tapering to a distal end, the recess having a corresponding shape to that of a cross section of the protruding member, the distal end being of a size that is smaller than the recess and the base being of a size that is greater than the recess.

\* \* \* \* \*